(12) United States Patent
Uitbeijerse et al.

(10) Patent No.: US 10,274,095 B2
(45) Date of Patent: Apr. 30, 2019

(54) VALVE AND MANUFACTURING METHOD FOR MANUFACTURING THE VALVE (71) Applicant: KONINKLIJKE PHILIPS N.V., Eindhoven (NL)

(72) Inventors: Bastiaan Uitbeijerse, Eindhoven (NL); Wiecher Ferdinand Kamping, Eindhoven (NL); Marijn Kessels, Eindhoven (NL); Paulus Cornelis Duineveld, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 100 days.

(21) Appl. No.: 15/037,084

(22) PCT Filed: Nov. 24, 2014

(86) PCT No.: PCT/EP2014/075348
§ 371 (c)(1),
(2) Date: May 17, 2016

(87) PCT Pub. No.: WO2015/078797
PCT Pub. Date: Jun. 4, 2015

(65) Prior Publication Data
US 2016/0305558 A1  Oct. 20, 2016

(30) Foreign Application Priority Data
Nov. 29, 2013 (EP) ..................... 13195090

(51) Int. Cl.
*F16K 15/14* (2006.01)
*B65D 51/16* (2006.01)

(52) U.S. Cl.
CPC .......... *F16K 15/147* (2013.01); *B65D 51/165* (2013.01)

(58) Field of Classification Search
CPC ............................. B65D 51/165; F16K 15/147
USPC ..................................... 137/843–850
See application file for complete search history.

(56) References Cited

U.S. PATENT DOCUMENTS

| | | | |
|---|---|---|---|
| 4,932,562 A * | 6/1990 | Christine | B68D 37/00 222/96 |
| 5,129,794 A | 7/1992 | Beatty | |
| 5,141,029 A * | 8/1992 | Naugle et al. | F15D 55/00 138/44 |
| 6,357,949 B1 | 3/2002 | Schwartzman | |
| 2004/0265523 A1 | 12/2004 | Koyanagi | |
| 2011/0108139 A1 | 5/2011 | Wright | |
| 2012/0085958 A1 | 4/2012 | Yang | |

FOREIGN PATENT DOCUMENTS

| | | |
|---|---|---|
| WO | 0069746 A1 | 11/2000 |
| WO | 2005042376 A1 | 5/2005 |
| WO | 2010107723 A2 | 9/2010 |
| WO | 2013139685 A1 | 9/2013 |

\* cited by examiner

*Primary Examiner* — P. Macade Nichols (57) ABSTRACT

A valve, such as for feeding appliances, has an inner space and walls partly enclosing the inner space. The inner space has a smaller first end and an opposing larger second end. The first end has a dimension being larger than 0 mm and smaller than or equal to 0.2 mm, and the inner space forms an opening through the valve or is closed at the first end by a closing part of the valve. The closing part of the valve has a thickness which is smaller than or equal to 0.1 mm.

12 Claims, 11 Drawing Sheets

VALVE AND MANUFACTURING METHOD FOR MANUFACTURING THE VALVE

This application is the U.S. National Phase application under 35 U.S.C. § 371 of International Application No. PCT/EP2014/075348, filed on Nov. 24, 2014, which claims the benefit of International Application No. 13195090.9 filed on Nov. 29, 2013. These applications are hereby incorporated by reference herein.

FIELD OF THE INVENTION

The invention relates to a valve and to a manufacturing method, a manufacturing apparatus and a manufacturing computer program for manufacturing the valve. The invention relates further to a mold structure for forming the valve.

BACKGROUND OF THE INVENTION

WO 2013/139685 A1 relates to a valve for an inhalation device comprising a base in the form of a ring defining a central opening, as well as an upper surface and a lower surface, both of which are planar and converge toward each other from the base in the direction opposite said base, wherein the upper and lower surfaces together form an angle of at least 60°, and the free edges thereof define a slit which is open when the valve is at rest.

WO 2010/107723 A2 provides apparatus featuring a check valve featuring a duckbill valve configured to provide fluid and particulate; and an insert having a base portion configured to seat the insert inside the duckbill valve, and a W-shaped portion configured with an opening to pass the fluid and particulate through the duckbill valve and also configured to provide support for walls of the duckbill valve in response to back pressure caused by the fluid and particulate.

US 2004/265523 A1 discloses a bonding structure of check-valves to a fluid container and a production apparatus of fluid container which is capable of reliably keeping the expansion of the fluid container without any fluid leakage after inflating the fluid container. As the check-valve is bonded to only one of thermoplastic container films, the check-valve is fixed to one of the container films, thereby preventing the reverse flow by tightly closing the check valve. As a result, the expansion of the fluid container is reliably maintained after the fluid container is inflated. The manufacturing apparatus includes an up-down roller controller which precisely positions the film to form the check valve. As a result, the manufacturing apparatus can produce the fluid container having the reliable check valves.

US 2012/085958 A1 discloses a plastic formed inflation mouth structure comprising a plastic formed body which is integrally formed with an inflation mouth by plastic injection molding. The inflation mouth includes an inflation apparatus passage and a restoration unit that are integrally formed. The inflation apparatus passage unit is formed with a notch for passage of an inflation apparatus to perform the inflation or deflation. The restoration unit applies an elastic restoration force onto the notch to make the notch assuredly enclose the inflation apparatus during the inflation and ensure a high airtightness when inflation is stopped.

Valves made of rubber, in particular, made of liquid silicone rubber (LSR), with slit openings are used in beverage feeding appliances, in order to control the flow of the beverage. The slit valves can be produced by liquid injection molding (LIM) followed by a slitting process for generating the slit in the respective valve. However, the macromolecules and atoms in the walls on each side of the slit have the tendency to bond again together, which leads to a sticking closing the slit. The valve may not open anymore when there is a pressure difference between the two sides of the valve, i.e. the valve function may fail. It is common practice to apply a slit valve as an air valve and drink valve in drinking appliance for children, such as baby bottles and spout cup. If the valve functions fails, the child cannot suck liquid from the drinking appliance due to the underpressure in the drinking appliance no longer being normalised. In order to crack the slit open, mechanical stress needs to be manually applied in the normal direction of the slit. This operation requires at least introducing a foreign object in the drinking container, such as a hand or a pin. This is not hygienic and may become infected with bacteria. Furthermore, this manual operation is in general too complex for common users and it results in high failure rates of products containing the valves with the slit openings.

SUMMARY OF THE INVENTION

It is an object of the present invention to provide a valve which less likely fails in providing the valve function. Moreover, it is an object of the present invention to provide a manufacturing method, manufacturing apparatus and manufacturing computer program for manufacturing the valve, and to provide a mold structure for forming the valve.

In a first aspect of the present invention a valve having an inner space and walls partly enclosing the inner space is presented, wherein the inner space has a smaller first end and an opposing larger second end, wherein the first end has a dimension being larger than 0 mm and smaller than or equal to 0.2 mm, if no pressure is applied to the valve, and wherein the inner space forms an opening through the valve or is closed at the first end by a closing part of the valve, if no pressure is applied to the valve, wherein the closing part of the valve has a thickness being smaller than or equal to 0.1 mm.

Since the inner space has a smaller first end and an opposing larger second end, wherein the first end has a dimension being larger than 0 mm and smaller than or equal to 0.2 mm, if no pressure is applied to the valve, and wherein the inner space forms an opening through the valve or is closed at the first end by a closing part of the valve, if no pressure is applied to the valve, wherein the closing part of the valve has a thickness being smaller than or equal to 0.1 mm, either the opening at the first end being larger than 0 mm and smaller than or equal to 0.2 mm already ensures that the valve can provide its valve function, or, if the valve is initially closed, when no pressure is applied to the valve, the relatively small thickness of the closing part ensures that the closing part can relatively easily be broken up, when pressure is applied to the valve, thereby also ensuring that the valve function can be provided. A valve having these dimensions therefore reduces the likelihood of a fail function of the valve.

Underlying the aspect of present invention relating the open first end is the following realization by the inventors.

For a liquid, like water, to enter into air through a restriction, a certain pressure difference is needed to overcome the surface tension. For, for example, a duckbill valve, the opening needed for water to enter the valve (i.e. for leakage happening) is equal to two times the surface tension, divided by the pressure difference:

$$D = \frac{2 \cdot \gamma}{P}$$

For a typical beverage this means $$D[\text{mm}] = \frac{1}{P[\text{mbar}]}$$

According to the present invention, the dimension of the initial opening (i.e. the opening when no pressure is applied) is determined such that with increasing pressure in the blocking direction the resulting opening stays below the value in the equation above.

The change in the opening of a duckbill valve due to a pressure difference in the blocking direction follows (in view of evaluations of FEM simulations or anaylsis of actual valves) the equation below, while parameters (summarized in the factor in the equation) that influence the actual behavior are, for example, length, width, height, wall thickness, material stiffness and overall shape:

$$\text{opening} = \text{opening}_{initial} - P \cdot \alpha$$

Figure 15:
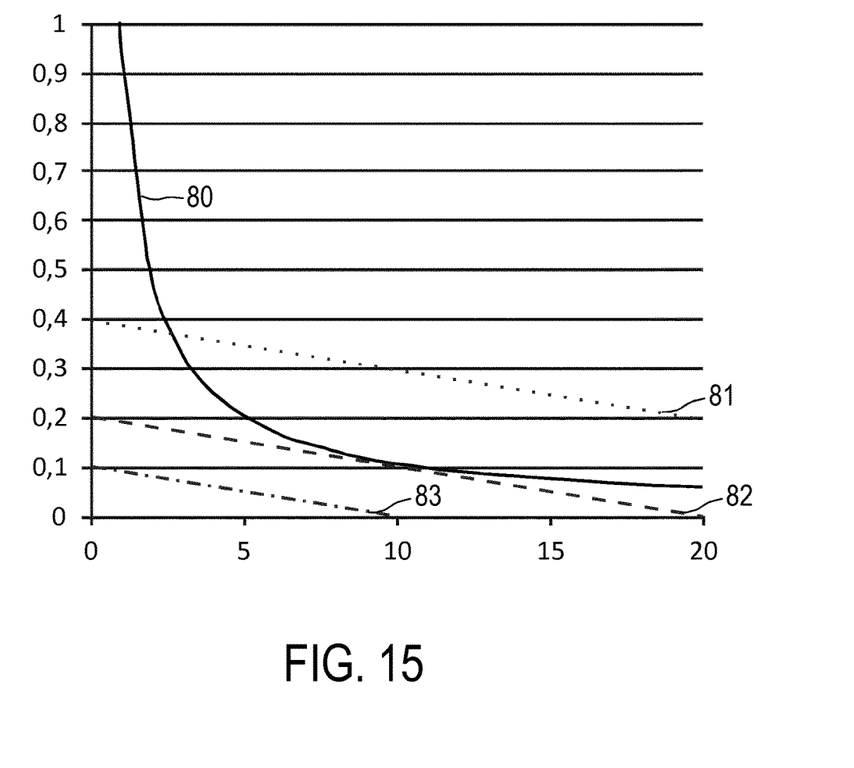
FIG. 15 shows a graph illustrating an exemplary relation of a valve opening of a duckbill valve to a pressure in blocking direction.

It was found that the initial opening of the valve should be less of 0.2 mm, as it is illustrated in FIG. 15.

While the above remarks focus on a duckbill valve, it is to be noted that the remarks as given above also apply to other valve types. It is part of the present invention to realize that the above discussed sticking which closes the slit may be avoided (as discussed in further detail below) by providing an open first end of the inner space of the valve and at the same time still a leakage of liquid along the blocking direction may be prevented if the open first end is dimensioned properly.

In a preferred embodiment the first end has a dimension being larger than 0 mm and smaller than or equal to 0.1 mm, if no pressure is applied to the valve. Moreover, the thickness of the closing part is preferentially equal to or smaller than 0.05 mm and even further preferred equal to or smaller than 0.01 mm. These small thicknesses of the closing part can further reduce the likelihood of a fail function of the valve. The valve is preferentially adapted for feeding appliances.

The inner space of the valve has preferentially a tapering cross section. The dimensions of the first end relate preferentially to dimensions of the first end within the tapering cross section of the inner space of the valve.

In a further aspect of the present invention a manufacturing method for manufacturing a valve is presented, wherein the manufacturing method comprises:
providing valve material for producing the valve,
producing the valve by using the provided valve material such that the produced valve has an inner space and walls partly enclosing the inner space, wherein the inner space has a smaller first end and an opposing larger second end, wherein the first end has a dimension being larger than 0 mm and smaller than or equal to 0.2 mm, if no pressure is applied to the produced valve, and wherein the inner space forms an opening through the valve or is closed at the first end by a closing part of the produced valve, if no pressure is applied to the valve, wherein the closing part of the produced valve has a thickness being smaller than or equal to 0.1 mm.

The provided valve material is preferentially an elastic material, especially rubber. In a preferred embodiment it is LSR.

Preferentially, the manufacturing method further comprises:
providing a mold structure for forming the valve, the mold structure comprising a cavity with a first wall and an opposing second wall, wherein an inner space forming element for forming the inner space of the valve extends from the first wall into the cavity towards the second wall, wherein a surface of the inner space forming element, which faces the second wall, has a smallest dimension being larger than 0 mm and smaller than or equal to 0.2 mm and has a distance to the second wall between 0 mm and 0.1 mm,
wherein the step of producing the valve includes:
curing the valve material in the mold structure for forming the valve with the inner space,
releasing the cured valve material from the mold structure.

Since the surface of the inner space forming element, which faces a second wall of the cavity, has a smallest dimension being larger than 0 mm and smaller than or equal to 0.2 mm and has a distance to the second wall between 0 mm and 0.1 mm, initially after curing the valve material either has already an opening whose smallest dimension is larger than 0 mm and smaller than or equal to 0.2 mm, or the valve material has a relatively thin closing part, which can easily be broken up during normal use when applying pressure, in order to provide the valve function. A following slitting or cutting procedure, which may influence the cut surfaces such that the tendency of sticking and the strength of the bonding is increased, is not necessarily needed. The user is therefore not bothered with any extra handlings or motions.

A surface can have different dimensions depending on the direction in which the respective dimension is measured. If the surface is circular, the dimension is independently of the direction and in this case the diameter of the surface is regarded as being the smallest dimension. If the surface has different diameters, for instance, in case of an elliptical surface, the smallest diameter is regarded as being the smallest dimension. If the surface is rectangular or has another shape having different sides with different lengths, the smallest dimension is the dimension of the side having the smallest length.

Since the surface of the inner space forming element, which faces the second wall, has a distance to the second wall between 0 mm and 0.1 mm, this distance is a) equal to 0 mm or b) larger than 0 mm and smaller than 0.1 mm or c) equal to 0.1 mm. In an embodiment the surface of the inner space forming element facing the second wall has a distance to the second wall between 0 mm and 0.05 mm. In a further embodiment this distance is between 0 mm and 0.01 mm. These even smaller distances lead to closing parts having a further reduced thickness, which in turn can lead to an easier breaking up of the closing part during normal use, thereby allowing for a further reduction of the likelihood of a failure of the valve function.

The inner space forming element preferentially has a tapering cross section. Moreover, the cavity may be shaped such that the cured valve material has V-shaped or sphere-shaped walls, wherein the inner sides of the walls are formed by the inner space forming element and the outer sides of the walls are formed by walls of the cavity. Alternatively, the cavity may be shaped such that the cured valve material forms a plate with an inner space, wherein the outer sides of the plate are formed by the walls of the cavity and the inner space is formed by the inner space forming element.

In another aspect of the present invention a mold structure for forming a valve and for being used by the manufacturing method is presented, wherein the mold structure comprises:
 a cavity with a first wall and an opposing second wall,
 an inner space forming element for forming an inner space of the valve, wherein the inner space forming element extends from the first wall into the cavity towards the second wall, wherein a surface of the inner space forming element, which faces the second wall, has a smallest dimension being larger than 0 mm and smaller than or equal to 0.2 mm and has a distance to the second wall between 0 mm and 0.1 mm.

In another aspect of the present invention a valve manufactured in accordance with the manufacturing method.

In another aspect of the present invention a manufacturing apparatus for performing the manufacturing method, wherein the manufacturing apparatus comprises:
 a valve material providing unit for providing valve material for producing the valve,
 a production unit for producing the valve by using the provided valve material such that the produced valve has an inner space and walls partly enclosing the inner space, wherein the inner space has a smaller first end and an opposing larger second end, wherein the first end has a dimension being larger than 0 mm and smaller than or equal to 0.2 mm, if no pressure is applied to the produced valve, and wherein the inner space forms an opening through the valve or is closed at the first end by a closing part of the produced valve, if no pressure is applied to the valve, wherein the closing part of the produced valve has a thickness being smaller than or equal to 0.1 mm.

Preferentially, the manufacturing apparatus further comprises:
 a mold structure providing unit for providing a mold structure for forming the valve, the mold structure comprising a cavity with a first wall and an opposing second wall, wherein an inner space forming element for forming an inner space of the valve extends from the first wall into the cavity towards the second wall, wherein a surface of the inner space forming element, which faces the second wall, has a smallest dimension being larger than 0 mm and smaller than or equal to 0.2 mm and has a distance to the second wall between 0 mm and 0.1 mm.
 wherein the production unit includes:
 a curing unit for curing the valve material in the mold structure for forming the valve with the inner space,
 a releasing unit for releasing the cured valve material from the mold structure.

In another aspect of the present invention a manufacturing computer program for manufacturing a valve is presented, wherein the computer program comprises program code means for causing a manufacturing apparatus to carry out the steps of the manufacturing method, when the computer program is run on a computer controlling the manufacturing apparatus.

It shall be understood that the valve, the manufacturing method, the mold structure, the manufacturing apparatus, and the manufacturing computer program have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings.

DETAILED DESCRIPTION OF EMBODIMENTS

Figure 1:
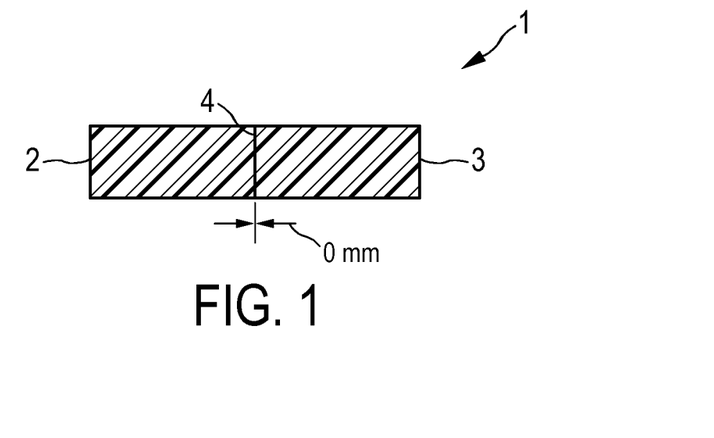
FIGS. 1 and 2 schematically and exemplarily illustrate prior art valves,
FIGS. 3 and 4 schematically and exemplarily illustrate different embodiments of valves according to the invention.
Figure 2:
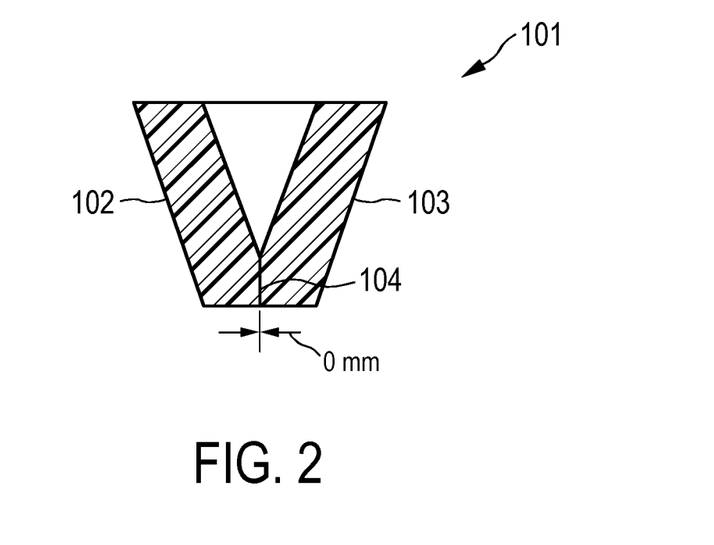

FIG. 1 shows schematically and exemplarily a cross sectional view of a prior art valve 1 with a slit 4 between two walls 2, 3 of the valve 1. FIG. 2 shows schematically and exemplarily a cross sectional view of a further prior art valve having a slit 104 between two walls 102, 103 of the valve 101.

The walls 2, 3 of the valve 1 shown in FIG. 1 are flush walls, whereas the walls 102, 103 of the valve 101 shown in FIG. 2 are V-shaped. The valve 1 with the two flush walls 2, 3 has an opening pressure, which is independent of the direction of the opening pressure, i.e. in FIG. 1 the pressure needed for opening the valve 1 is independent of whether the pressure direction is a top-down direction or a down-top direction. Regarding the V-shaped valve 101 shown in FIG. 2 the opening pressure depends on the pressure direction. The V-shaped valve 101 may be regarded as being a duckbill valve. Both valves 1, 101 have an opening with an initial gap of zero.

Figure 3:
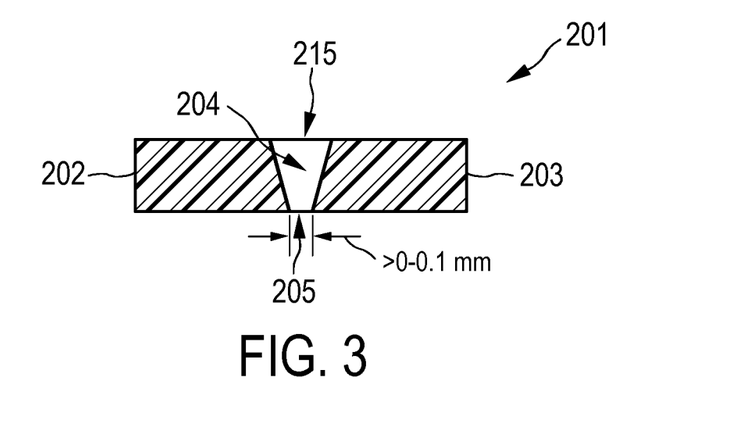
Figure 4:
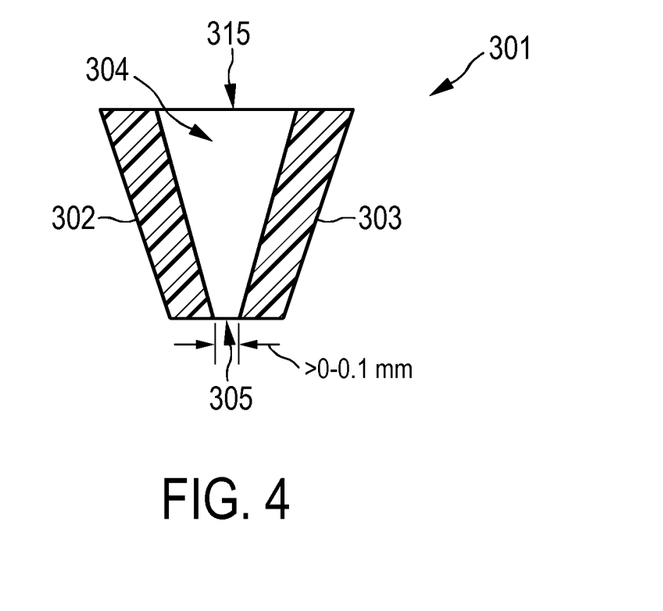

FIGS. 3 and 4 schematically and exemplarily show embodiments of valves according to the invention having initial openings. In the cross sectional view of FIG. 3 the valve 201 comprises walls 202, 203 with a slit 204 between the walls 202, 203, wherein the slit 204 has a tapering cross section and the walls 202, 203 are preferentially straight. Preferentially, the cross section forms an isosceles trapezoid. Also the surface of the respective wall 202, 203 may be tapered. However, the surface of the respective wall 202, 203 can also have another shape, for instance, it can be rectangular.

The slit 204 forms an open inner space, i.e. an opening, within the valve 201. Because of the tapering cross section of the slit 204, the slit comprises a smaller first end 205 and a larger second end 215. The smaller first end 205 has initially a width being larger than 0 mm and equal to or smaller than 0.1 mm, wherein these dimensions relate to a situation, in which no pressure is applied to the valve 201 and the walls 202, 203 do not stick together. If there is a pressure difference between the two opposing sides of the valve 201 or if the opposing walls 202, 203 of the valve 201 are in contact with each other and stick together, the slit 204 may be wider at the first end 205 or the slit 204, which is initially open, may be closed, respectively. If the walls 202, 203 stick together at the first end 205 of the slit 204, this sticking can be easily overcome and the slit 204 can be easily broken up again by a normal use of the valve 201. Because the slit was formed during the manufacturing process and not by a post-manufacturing cut action, the two sides of the slit have a weaker tendency to stick than slits formed by a cut action. Furthermore, the cohesion forces between the two sides of the slit of the valve are weaker than the cohesion forces in a slit manufactured by a post-manufacturing cut action. Thus the two sides of the slit stick less often and, if they stick, require less effort to detach.

In the cross sectional view of FIG. 4 the valve 301 has two walls 302, 303 with an intermediate slit 304 having a tapering cross section. The walls 302, 303 are preferentially straight. Preferentially, the cross section forms an isosceles trapezoid. Also the surface of the respective wall 302, 303 may be tapered. However, the surface of the respective wall 302, 303 can also have another shape, for instance, it can be rectangular.

The slit 304 forms an open inner space, i.e. an opening, within the valve 301. Due to the tapering cross section the slit 304 has a smaller first end 305 and a larger second end 315. The width of the smaller first end 305 is initially larger than 0 mm and smaller than or equal to 0.1 mm. These dimensions relate also in this embodiment to a situation, in which no pressure is applied to the valve 301 and the walls 302, 303 do not stick together. If the walls 302, 303 stick together, the corresponding bonding can easily be broken up by the normal use of the valve 301.

The valve 301 shown in FIG. 4 is a duckbill valve having V-shaped walls 302, 303. The walls of the valve can of course also be shaped in another way. For instance, they can be spherically shaped, they can be dome shaped or they can be substantially rectangular as schematically and exemplarily shown in FIG. 3, wherein the inner sides of the walls forming the slit may be inclined for forming the tapering cross section of the slit 204.

Figure 5:
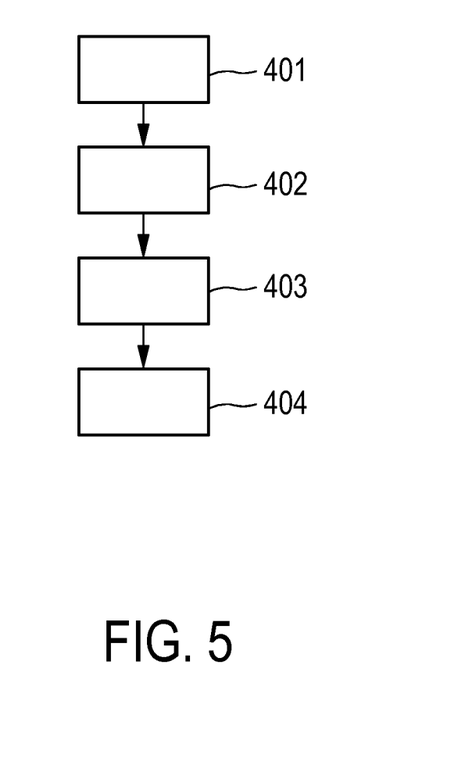
FIG. 5 shows a flowchart exemplarily illustrating an embodiment of a manufacturing method for manufacturing the valves illustrated in FIGS. 3 and 4,
FIGS. 6 and 7 schematically and exemplarily illustrate mold structures used during the manufacturing process,
FIG. 8 schematically and exemplarily illustrates an embodiment of a manufacturing apparatus for performing the manufacturing method,
FIGS. 9 and 10 schematically and exemplarily illustrate further embodiments of valves according to the invention,
FIGS. 11 and 12 schematically and exemplarily illustrate further embodiments of mold structures,
FIGS. 13 and 14 schematically and exemplarily illustrate prior art cutting or slitting steps.

In the following an embodiment of a manufacturing method for manufacturing a valve according to the invention will exemplarily be described with reference to a flowchart shown in FIG. 5.

In step 401 a mold structure is provided. A mold structure 211 for manufacturing the valve 201 schematically and exemplarily illustrated in FIG. 3 is schematically and exemplarily illustrated in FIG. 6.

Figure 6:
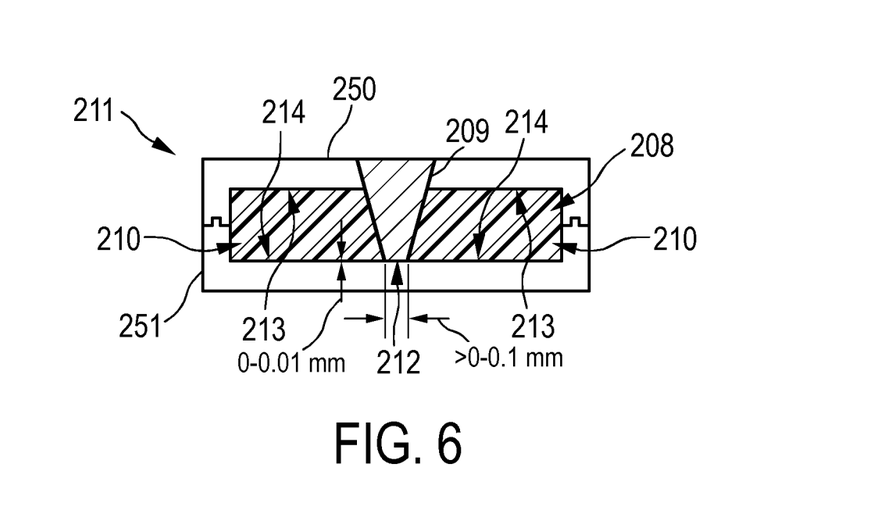

The mold structure 211 shown in FIG. 6 comprises a cavity 210 with a first wall 213 and an opposing second wall 214 and a slit forming element 209, i.e. an inner space forming element, extending from the first wall 213 into the cavity 210 towards the second wall 214, wherein a surface 212 of the slit forming element 209, which faces the second wall 214, has a smallest dimension being larger than 0 mm and smaller than or equal to 0.1 mm. The slit forming element 209 can be regarded as being a core or a pin, especially a sharp core or pin. The surface 212 of the slit forming element 209 may be circular, rectangular or may have another shape. If the surface 212 is circular, the smallest dimension, which is larger than 0 mm and smaller than or equal to 0.1 mm, is the diameter of the surface and, if the surface 212 is rectangular, the smallest dimension being larger than 0 mm and smaller than or equal to 0.1 mm is the length of the smallest side of the rectangular surface.

In this embodiment the cavity 210 is formed by an enclosing casing having two parts, a first part 250 with an opening for receiving the slit forming element 209 and with the first wall 213 and a second part 251 with the second wall 214. One of the first and second parts 650, 651 comprises a groove and the other of the first and second parts 250, 251 comprises a protrusion fitting to the groove for ensuring a proper alignment of the first and second parts 250, 251. Moreover, the cavity 210 and the slit forming element 209 are dimensioned such that the surface 212 of the slit forming element 209 facing the second wall 214 of the cavity 210 has a distance to the second wall 214 between 0 mm and 0.01 mm, i.e. this distance may be 0 mm, larger than 0 mm and smaller 0.01 mm or equal to 0.01 mm. Moreover, the slit forming element 209 has a tapering cross section. The cavity 210 is shaped such that the finally formed valve is a plate with an inner slit as schematically and exemplarily illustrated in FIG. 3, wherein the outer sides of the plate are formed by the walls of the cavity 210 and the inner slit 204 is formed by the slit forming element 209.

Figure 7:
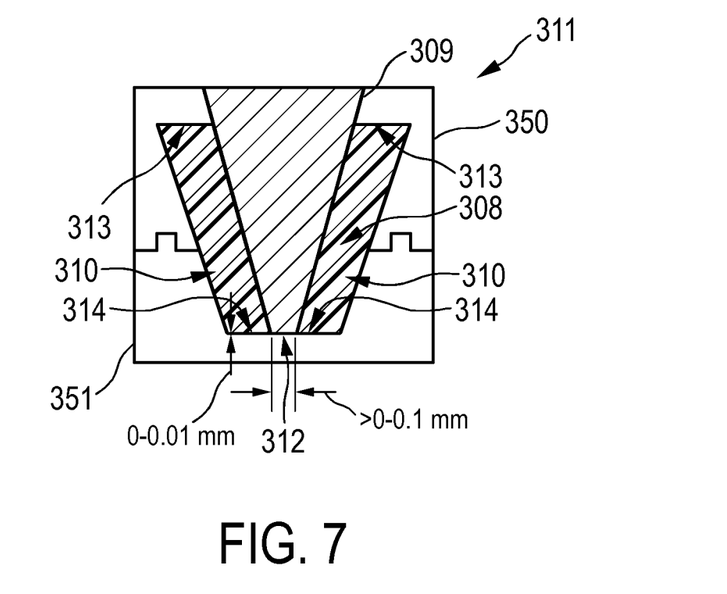

For manufacturing the valve 301 schematically and exemplarily illustrated in FIG. 4 in step 401 a mold structure 311 may be provided, which is schematically and exemplarily illustrated in FIG. 7. Also this mold structure 311 comprises a cavity 310 with a first wall 313 and an opposing second wall 314, wherein a slit forming element 309 extends from the first wall 313 into the cavity 310 towards the second wall 314, wherein a surface 312 of the slit forming element 309, which faces the second wall 314, has a smallest dimension being larger than 0 mm and smaller than or equal to 0.1 mm. Moreover, also in this embodiment the surface 312 of the slit forming element 309 facing the second wall 314 has a distance to the second wall 314 between 0 mm and 0.01 mm and the slit forming element 309 has a tapering cross section. In this embodiment the cavity 310 is formed by an enclosing casing having two parts, a first part 350 with an opening for receiving the slit forming element 309 and with the first wall 313 and a second part 351 with the second wall 314. One of the first and second parts 350, 351 comprises a groove and the other of the first and second parts 350, 351 comprises a protrusion fitting to the groove for ensuring a proper alignment of the first and second parts 350, 351.

In this embodiment the cavity 310 is shaped such that the finally produced valve 301 has V-shaped walls 302, 303, wherein the inner sides of the walls 302, 303 are formed by the slit forming element 309 and the outer sides of the walls 302, 303 are formed by the walls of the cavity 310. Moreover, also in this embodiment the slit forming element 309 may be regarded as being a core or a pin forming the slit during the manufacturing process, which is preferentially a LIM process. Alternatively, the respective slit forming element 209, 309 is fixed in the mold and a separate insert opening is present.

In step 402 valve material 208, 308 to be molded in the respective mold structure 211, 311 is provided. In particular, the valve material 208, 308 can be filled into the respective cavity 201, 301, whereafter the cavity can be closed by using the respective slit forming element 209, 309, i.e. in this embodiment the respective casing forming the respective cavity 210, 310 comprises an upper opening for the respective slit forming element 209, 309, wherein the respective slit forming element 209, 309 can be put into the respective opening of the respective cavity 210, 310 for closing the respective cavity 210, 310 after having being filled with the valve material 208, 308. The provided valve material 208, 308 is preferentially LSR.

In step 403 the valve material 208, 308 in the respective mold structure 211, 311 is cured for forming the respective valve 201, 301 with the respective slit 204, 304, wherein the cured valve material 208, 308 is elastic. Curing is preferentially performed by heating the respective mold structure 211, 311 with the valve material 208, 308. The heating may be performed up to a temperature between 170° C. to 220° C. In step 404 the cured valve material 208, 308 is released from the respective mold structure 211, 311, in order to provide the respective valve 201, 301. In particular, the respective first part 250, 350 is separated from the respective second part 251, 351 of the respective casing for realising the respective valve 201, 301 from the respective mold structure 211, 311.

All or some steps of the manufacturing method may be performed manually. However, in an embodiment the manufacturing method may also be performed automatically. In particular, a manufacturing apparatus may be used for performing the manufacturing method. An embodiment of a manufacturing apparatus 500 is schematically and exemplarily shown in FIG. 8.

Figure 8:
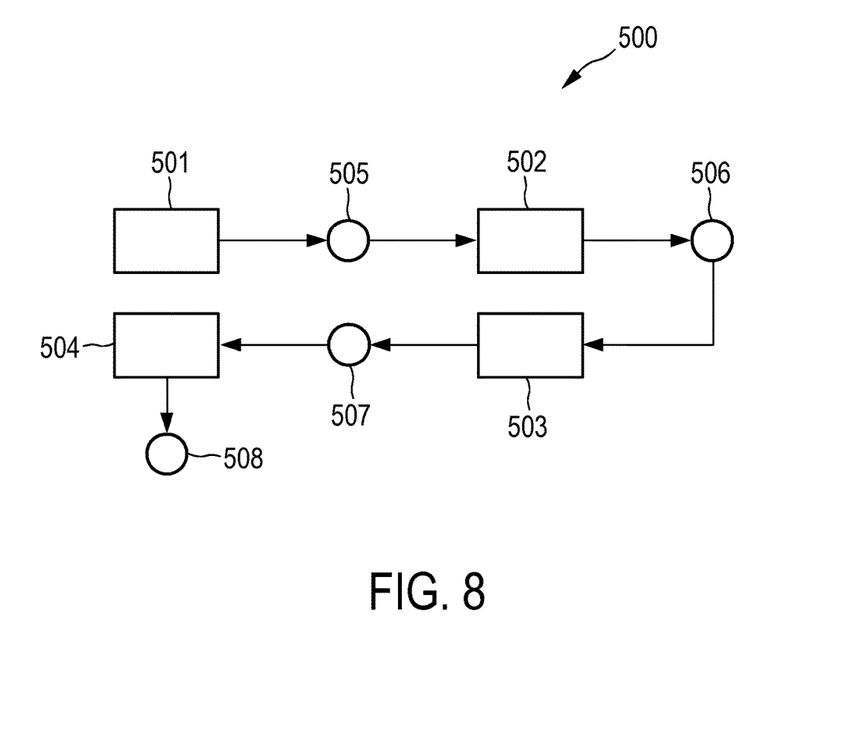

The manufacturing apparatus 500 comprises a mold structure providing unit 501 for providing the mold structure forming the valve, wherein the mold structure comprises a cavity with the first wall and the opposing second wall, wherein the slit forming element extends from the first wall into the cavity towards the second wall and wherein the surface of the slit forming element, which faces the second wall, has a smallest dimension being larger than 0 mm and smaller than or equal to 0.1 mm. The mold structure providing unit 501 may comprise a place at which one or several mold structures are present, which can be provided for being used for manufacturing the valve. In FIG. 8 the mold structure is indicated by reference number 505.

The manufacturing apparatus 500 further comprises a valve material providing unit 502 for providing valve material to be molded in the mold structure. For instance, the valve material providing unit 502 can be adapted to fill the valve material, in particular, LSR, into the cavity of the mold structure, whereafter the mold structure may be automatically or manually closed by for example using the respective slit forming element or a separate cavity closure. The mold structure with the valve material to be molded is indicated by reference number 506 in FIG. 8.

The manufacturing apparatus 500 further comprises a curing unit 503 for curing the valve material in the mold structure forming the valve with the slit, wherein the cured valve material is elastic. The curing unit 503 is preferentially a heating unit for heating the mold structure with the material to a desired temperature over a desired time. The mold structure with the cured valve material is indicated by reference number 507 in FIG. 8.

The manufacturing apparatus 500 further comprises a releasing unit 504 for releasing the cured valve material from the mold structure, wherein the released cured valve material, i.e. the produced valve, is indicated by reference number 508 in FIG. 8. For instance, the releasing unit 504 can comprise some mechanical means for separating the cured valved material from the mold structure. In particular, the releasing unit 504 may be adapted to separate the first and second parts of the casing forming the cavity from each other, in order to detach these parts from the valve. The releasing unit 504 may then further be adapted to hold the slit forming element and to separate the valve from the slit forming element by, for instance, blowing or by mechanical means.

The curing unit 503 and the releasing unit 504 can be regarded as forming a production unit for producing the valve by using the provided valve material.

Figure 9:
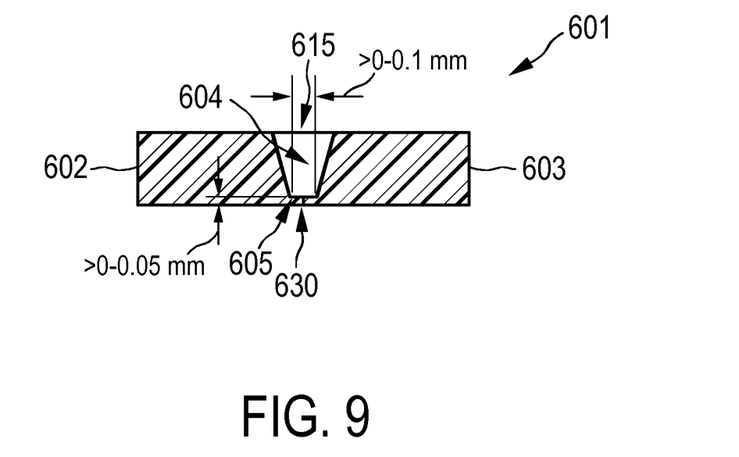
Figure 10:
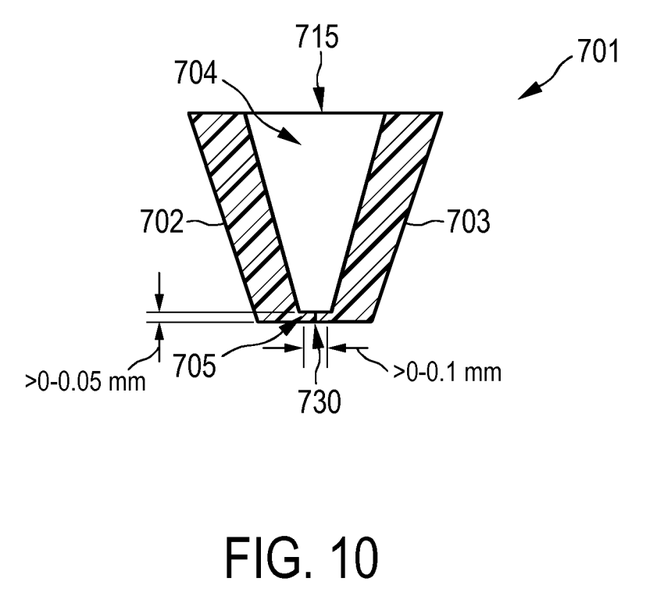

FIGS. 9 and 10 schematically and exemplarily illustrate further embodiments of the valve according to the invention.

In the cross sectional view of FIG. 9 the valve 601 comprises walls 602, 603 partially enclosing a tapering inner space 604. Preferentially, the cross section forms an isosceles trapezoid. The inner space 604 has a smaller first end 605 and an opposing larger open second end 615, wherein the first end 605, i.e. the inner surface forming the first end, has a dimension being larger than 0 mm and smaller than 0.1 mm, if no pressure is applied to the valve 601. The inner space 604 is closed at the first end 605 by a closing part 630 of the valve 601, if no pressure is applied to the valve, wherein the closing part 630 has a thickness being equal to or smaller than 0.05 mm. Since the closing part 630 is relatively thin, it breaks up when during normal use pressure is applied to the valve 601, in order to provide the valve function. The walls 602, 603 are preferentially straight. Also the surface of the respective wall 602, 603 may be tapered. However, the surface of the respective wall 602, 603 can also have another shape, for instance, it can be rectangular.

In the cross sectional view of FIG. 10 the valve 701 has two walls 702, 703 partially enclosing a tapering inner space 704. Preferentially, the cross section forms an isosceles trapezoid. Also in this embodiment the inner space 704 has a smaller first end 705 and an opposing larger open second end 715, wherein the first end 705, i.e. the inner surface forming the first end 705, has a dimension being larger than 0 mm and smaller than 0.1 mm, if no pressure is applied to the valve 701. The inner space 704 comprises a closing part 730 at its first end 705, which is initially present when no pressure is applied to the valve 701. The thickness of the closing part 730 is equal to or smaller than 0.05 mm, wherein because of this small thickness of the closing part 730 it can easily be broken up during normal use, when pressure is applied to the valve 701, in order to provide the valve function. The walls 702, 703 are preferentially straight. Also the surface of the respective wall 702, 703 may be tapered. However, the surface of the respective wall 702, 703 can also have another shape, for instance, it can be rectangular The valve 701 shown in FIG. 10 is a duckbill valve having V-shaped walls 702, 703. The walls of the valve can of course also be shaped in another way. For instance, they can be spherically shaped, they can be dome shaped or they can be substantially rectangular as schematically and exemplarily shown in FIG. 9, wherein the inner sides of the walls 602, 603 forming the inner space 604 are inclined for forming the tapering cross section of the inner space 604. For manufacturing the valves 601, 701 schematically and exemplarily illustrated in FIGS. 9 and 10 the mold structures schematically and exemplarily shown in FIGS. 11 and 12 may be used.

Figure 11:
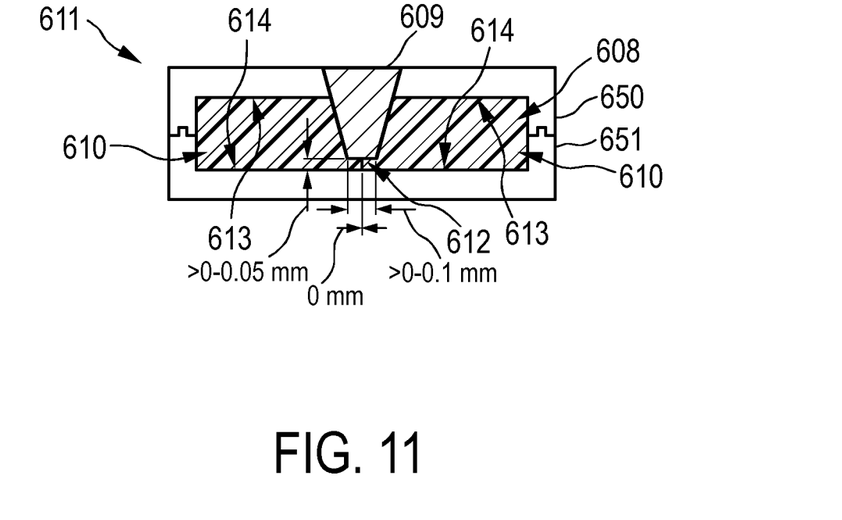

The mold structure 611 shown in FIG. 11 comprises a cavity 610 with a first wall 613 and an opposing second wall 614 and an inner space forming element 609 extending from the first wall 613 into the cavity 610 towards the second wall 614, wherein a surface 612 of the inner space forming element 609, which faces the second wall 614, has a smallest dimension being larger 0 mm and smaller than or equal to 0.1 mm. Also in this embodiment the inner space forming element 609 can be regarded as being a core or pin. The surface 612 of the inner space forming element 609 may be circular, rectangular or may have another shape. If the surface 612 is circular, the smallest dimension, which is larger than 0 mm and small than or equal to 0.1 mm, is the diameter of the surface 612 and, if the surface 612 is rectangular, the smallest dimension being larger than 0 mm and smaller than or equal to 0.1 mm is the length of the smallest side of the rectangular surface.

In this embodiment the cavity 610 is formed by an enclosing casing having two parts, a first part 650 with an opening for receiving the slit forming element 609 and with the first wall 613 and a second part 651 with the second wall 614. One of the first and second parts 650, 651 comprises a groove and the other of the first and second parts 650, 651 comprises a protrusion fitting to the groove for ensuring a proper alignment of the first and second parts 650, 651. Moreover, the cavity 610 and the inner space forming element 609 are dimensioned such that the surface 612 of the inner space forming element 609 facing the second wall 614 of the cavity 610 has a distance to the second wall 614 being equal to or smaller than 0.05 mm. Furthermore, the inner space forming element 609 has a tapering cross section. The cavity 610 is shaped such that the finally formed valve is a plate with an inner space as schematically and exemplarily illustrated in FIG. 9, wherein the outer sides of the plate are formed by the walls of the cavity 610 and the inner space 604 is formed by the inner space forming element 609.

Figure 12:
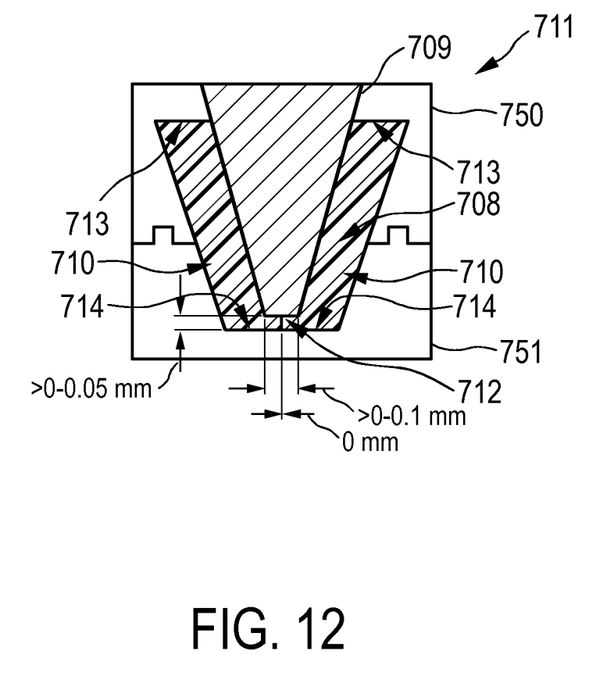

For manufacturing the valve 701 schematically and exemplarily illustrated in FIG. 10 the mold structure 711 schematically and exemplarily shown in FIG. 12 may be used. Also the mold structure 711 comprises a cavity 710 with a first wall 713 and an opposing second wall 714, wherein an inner space forming element 709 extends from the first wall 713 into the cavity 710 towards the second wall 714, wherein a surface 712 of the inner space forming element 709, which faces the second wall 714, has a smallest dimension being larger 0 mm and smaller than or equal to 0.1 mm. Moreover, also in this embodiment the surface 712 of the inner space forming element 709 facing the second wall 714 has a distance to the second wall 714 being smaller than or equal to 0.05 mm and the inner space forming element 709 has a tapering cross section. In this embodiment the cavity 710 is formed by an enclosing casing having two parts, a first part 750 with an opening for receiving the slit forming element 709 and with the first wall 713 and a second part 751 with the second wall 714. One of the first and second parts 750, 751 comprises a groove and the other of the first and second parts 750, 751 comprises a protrusion fitting to the groove for ensuring a proper alignment of the first and second parts 750, 751.

In this embodiment the cavity 710 is shaped such that the finally produced valve 701 has V-shaped walls 702, 703, wherein the inner sides of the walls 702, 703 are formed by the inner space forming element 709 and the outer sides of the walls 702, 703 are formed by the walls of the cavity 710. Moreover, also in this embodiment the inner space forming element 709 may be regarded as being a core or a pin forming the inner space during the manufacturing process, which is preferentially a LIM process. In FIGS. 11 and 12 reference numbers 608, 708 indicate the valve material, which is preferentially LSR.

Due to the distance between the respective surface 612, 712 of the respective inner space forming element 609.709 to the respective second wall 614, 714 of the respective cavity 610, 710, a respective closing part 630, 730 of the respective valve 601, 701 is formed, which can easily be broken up during normal use such that also in these embodiments an additional slitting or cutting step as used for producing the prior art valves schematically and exemplarily illustrated in FIGS. 1 and 2 is not needed, thereby simplifying the manufacturing process.

Figure 13:
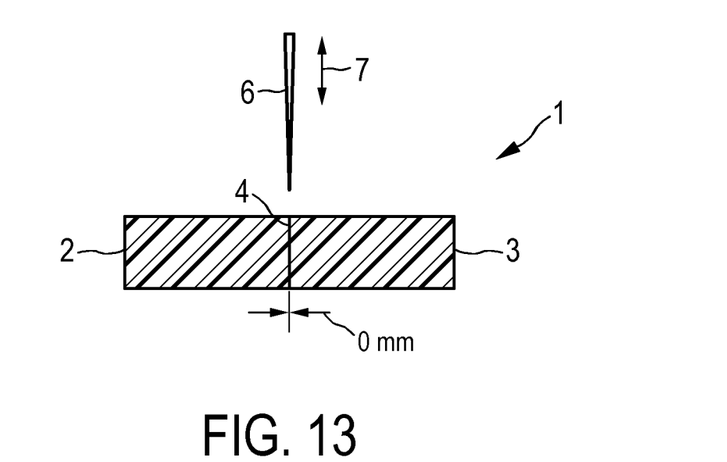
Figure 14:
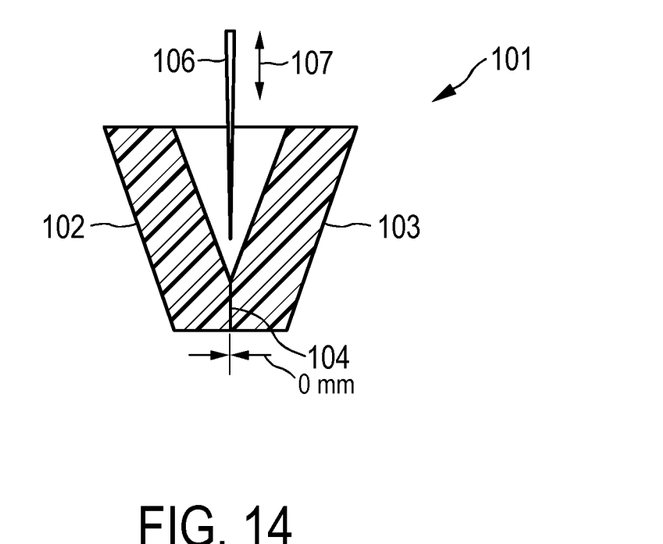

In particular, in a prior art manufacturing process for manufacturing the prior art valves 1, 101 a knife 6, 106 needs to be moved along the directions indicated by the double arrows 7, 107 in FIGS. 13 and 14, whereas such a knife is not necessarily needed by the manufacturing method described above with reference to FIGS. 5 to 7, 11 and 12.

FIG. 15 shows a graph illustrating an exemplary relation of a valve opening of a duckbill valve to a pressure in blocking direction. The axis of abscissae shows the pressure inside a vessel (e.g. a feeding appliance), while the axis of ordinates shows the valve openings of exemplary valves.

The solid line 80 shows the leak-line, i.e. divides a region of leaking (i.e. too high a pressure and/or too high a valve opening for the valve to keep the liquid inside) from a region of containment.

The dotted line 81, the dashed line 82 and the dashed-and-dotted line 83 show the respective valve openings for three respective cases of different initial valve openings of 0.4, 0.2, and 0.1 mm, respectively. The dotted line 81 for the initial opening of 0.4 mm crosses the leak-line 80 and it can thus be seen that the such initial opening leakage may only be prevented to approximately a pressure of 3 mbar. In contrast, the dashed line 82 and the dashed-and-dotted line 83, i.e. the values of openings starting from 0.2 and 0.1 mm, remain below the leak-line, so no leakage occurs even for higher pressures.

The valves described above with reference to FIGS. 3, 4, 9 and 10 have an improved performance, because, if the walls of the valves are in contact, the contact areas of the walls on each side are smaller than the contact areas, which are present, if the prior art valves described above with reference to FIGS. 1 and 2 are used, i.e., since the contact areas are smaller, the contact pressures between the contact areas are higher such that the respective valve is more responsive for pressure differences and thus more robust against leaking Moreover, the valves described above with reference to FIGS. 3, 4, 9 and 10 have a better control of flow and less spread of the opening pressure, because the geometry and position accuracy of the initial opening or of the opening after an initial closing part has been broken up, are higher than the geometry and position accuracy of prior art slit valves.

Furthermore, the valves described above with reference to FIGS. 3, 4, 9 and 10 provide a maximal control on the surface profile and the texture of the inner surfaces, thereby decreasing the risk of leakage and too strong sticking.

Because of the tapering cross section of the inner space, because of the surface microstructure on the inner surfaces of the inner space and since the inner surfaces of the inner space have been molded and cured, the area where the molecules and/or atoms can bond is very small. Correspondingly, if such a bond is present, it can be relatively easily broken by the pressure that is applied by normal use.

The valves described above with reference to FIGS. 3, 4, 9 and 10 have an improved performance due to a more robust design. Moreover, they are more reliable due to less sticking Also the manufacturing process is improved, because less manufacturing steps are needed, i.e. an additional slitting or cutting step is not needed.

The valves are preferentially valves for toddler cups and baby bottles, but the valves can also be valves for feeding elderly people, for sport beverages, for drinking during physical activities, for drinking during resting, for drinking in a hospital bed or care house, et cetera. The valve can form a teat and/or spout, in particular, a bottle and/or pacifier teat.

The valves according to the present invention may be provided with particular benefit as air inlet valves for feeding or drinking appliances (in particular for children, like with baby bottles, toddler cups, drinking teats, spout cups etc.) for avoiding the built up of an underpressure. The valves according to the present invention prevent, if used as air inlet valves for such purpose, not only the built up of an underpressure but also avoid or at least minimize the risk of leakage of liquid (e.g. water or other beverages) through such air inlet, even in case of hydrostatic pressure due to the weight of the liquid.

The arrangement of the valves as illustrated in FIGS. 3, 4, 9 and 10 for the purpose of an air inlet valve for a feeding or drinking appliance would be that the inside of the appliance would be—in the illustrations—below the valve, while the outside of the appliance, i.e. the ambient air, would be above. It is to be understood that these directions and indications are just for illustrative purposes and are not to be considered as limiting. Although in above described embodiments the openings in the valves, which are initially present or after the valves have been broken up, are slits, in other embodiments the valves can also comprise other kinds of openings. Moreover, although in above described embodiments the valves have been manufactured by molding, in other embodiments the valves can also be manufactured by using another manufacturing process like machining, wherein the machining may be mechanical machining or laser machining Although in the embodiments described above with reference to FIGS. 3, 4, 9 and 10 the width of the smaller first end of the inner space is larger than 0 mm and smaller than or equal to 0.1 mm, in other embodiment this width can also be larger than 0 mm and smaller than or equal to 0.2 mm.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the provision of the mold structure, the provision of the material, the curing of the valve material, et cetera performed by one or several units or devices can be performed by any other number of units or devices. The control of the manufacturing apparatus in accordance with the manufacturing method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a valve, especially for feeding appliances, having an inner space and walls partly enclosing the inner space. The inner space has a smaller first end and an opposing larger second end, wherein the first end has a dimension being larger than 0 mm and smaller than or equal to 0.2 mm and wherein the inner space forms an opening through the valve or is closed at the first end by a closing part of the valve, wherein the closing part of the valve has a thickness being smaller than or equal to 0.1 mm. Since either the opening with the defined dimensions or a relative thin closing part which can easily be broken up is present, the likelihood of a fail function of the valve can be reduced.

The invention claimed is:

1. A valve for use with a fluid having an inner space and walls partly enclosing the inner space, wherein the inner space has a smaller first end and an opposing larger second end, wherein the first end has an opening with a width sized based on a surface tension of the fluid and a pressure difference expected across the valve, when no pressure is applied to the valve, wherein the inner space forms an opening through the valve, and wherein the width, with increasing pressure in a blocking direction of the valve, remains larger than zero and smaller than or equal to two times the surface tension of the fluid divided by the pressure difference.

2. The valve as defined in claim 1, wherein the width is larger than 0 mm and smaller than or equal to 0.2 mm, when no pressure is applied to the valve.

3. The valve as defined in claim 1, wherein the valve is adapted for feeding appliances.

4. A manufacturing method for manufacturing a valve, the manufacturing method comprising acts of:
providing valve material for producing the valve by a valve material providing unit;
producing the valve by using the provided valve material such that the produced valve has an inner space and walls partly enclosing the inner space by a production unit, wherein the inner space has a smaller first end and an opposing larger second end, wherein the first end has a dimension being larger than 0 mm and smaller than or equal to 0.2 mm, when no pressure is applied to the produced valve, and wherein the inner space forms an opening through the valve;
providing a mold structure for forming the valve, the mold structure comprising a cavity with a first wall and an opposing second wall, wherein an inner space forming element for forming the inner space of the valve extends from the first wall into the cavity towards the second wall, wherein a surface of the inner space forming element facing the second wall, has a smallest dimension being larger than 0 mm and smaller than or equal to 0.2 mm and has a distance to the second wall between 0 mm and 0.1 mm,
wherein the act of producing the valve includes acts of:
curing the valve material in the mold structure for forming the valve with the inner space; and
releasing the cured valve material from the mold structure.

5. The manufacturing method as defined in claim 4, wherein the surface of the inner space forming element facing the second wall has a distance to the second wall between 0 mm and 0.05 mm.

6. The manufacturing method as defined in claim 4, wherein the inner space forming element has a tapering cross section.

7. The manufacturing method as defined in claim 4, wherein the cavity is shaped such that the cured valve material has V-shaped or sphere-shaped walls, wherein the inner sides of the walls are formed by the inner space forming element and the outer sides of the walls are formed by walls of the cavity.

8. The manufacturing method as defined in claim 4, wherein the cavity is shaped such that the cured valve material forms a plate with an inner space, wherein the outer sides of the plate are formed by the walls of the cavity and the inner space is formed by the inner space forming element.

9. The manufacturing method as defined in claim 4, wherein the provided valve material is liquid silicone rubber.

10. A mold structure for forming a valve and for being used by the manufacturing method as defined in claim 4, the mold structure comprising: a cavity with a first wall and an opposing second wall, an inner space forming element for forming an inner space of the valve, wherein the inner space forming element extends from the first wall into the cavity towards the second wall, wherein a surface of the inner space forming element, which faces the second wall, has a smallest dimension being larger than 0 mm and smaller than or equal to 0.2 mm and has a distance to the second wall between 0 mm and 0.1 mm.

11. A manufacturing apparatus for performing the manufacturing method as defined in claim 4, the manufacturing apparatus comprising: a valve material providing unit for providing valve material for producing the valve, a production unit for producing the valve by using the provided valve material such that the produced valve has an inner space and walls partly enclosing the inner space, wherein the inner space has a smaller first end and an opposing larger second end, wherein the first end has a dimension being larger than 0 mm and smaller than or equal to 0.2 mm, when no pressure is applied to the produced valve, and wherein the inner space forms an opening through the valve, wherein the manufacturing apparatus further comprises: a mold structure providing unit for providing a mold structure for forming the valve, the mold structure comprising a cavity with a first wall and an opposing second wall, wherein an inner space forming element for forming an inner space of the valve extends from the first wall into the cavity towards the second wall, wherein a surface of the inner space forming element, which faces the second wall, has a smallest dimension being larger than 0 mm and smaller than or equal to 0.2 mm and has a distance to the second wall between 0 mm and 0.1 mm, wherein the production unit includes: a curing unit for curing the valve material in the mold structure for forming the valve with the inner space, a releasing unit for releasing the cured valve material from the mold structure.

12. A non-transitory machine-readable medium comprising instructions for causing one or more processors to carry out the acts of the manufacturing method for manufacturing a valve of claim 4.

* * * * *